(12) United States Patent
Grube et al.

(10) Patent No.: US 12,398,563 B2
(45) Date of Patent: Aug. 26, 2025

(54) CONSTRUCTION MATERIAL WITH IMPROVED LAP INTEGRITY

(71) Applicant: MAPEI S.p.A., Milan (IT)

(72) Inventors: Louis L. Grube, Deerfield Beach, FL (US); Mathew Snell, Deerfield Beach, FL (US); Natalino Zanchetta, Deerfield Beach, FL (US)

(73) Assignee: MAPEI S.P.A., Milan (IT)

( * ) Notice: Subject to any disclaimer, the term of this patent is extended or adjusted under 35 U.S.C. 154(b) by 251 days.

(21) Appl. No.: 17/088,766

(22) Filed: Nov. 4, 2020

(65) Prior Publication Data

US 2021/0131107 A1 May 6, 2021

Related U.S. Application Data

(60) Provisional application No. 62/930,199, filed on Nov. 4, 2019.

(51) Int. Cl.
| | |
|---|---|
| *E04D 1/30* | (2006.01) |
| *D06N 5/00* | (2006.01) |
| *E04D 5/02* | (2006.01) |
| *E04D 5/10* | (2006.01) |
| *E04D 5/12* | (2006.01) |
| *E04D 7/00* | (2006.01) |
| *E04D 1/00* | (2006.01) |

(52) U.S. Cl.
CPC ............ *E04D 7/005* (2013.01); *D06N 5/006* (2013.01); *E04D 1/30* (2013.01); *E04D 5/02* (2013.01); *E04D 5/10* (2013.01); *E04D 5/12* (2013.01); *E04D 2001/005* (2013.01); *Y10T 428/2495* (2015.01); *Y10T 428/31815* (2015.04)

(58) Field of Classification Search
None
See application file for complete search history.

(56) References Cited

U.S. PATENT DOCUMENTS

| | | | | |
|---|---|---|---|---|
| 4,717,614 | A * | 1/1988 | Bondoc | E04D 1/26 52/553 |
| 6,360,506 | B1 * | 3/2002 | Graae | E04D 5/12 52/552 |
| 6,924,015 | B2 | 8/2005 | Zanchetta et al. | |
| 7,803,239 | B2 | 9/2010 | Scheirer et al. | |
| 2004/0009319 | A1 * | 1/2004 | Zanchetta | E04D 5/10 428/40.1 |
| 2009/0064628 | A1 * | 3/2009 | Mellott, II | B32B 27/20 52/741.1 |
| 2011/0281094 | A1 * | 11/2011 | Zanchetta | E04D 5/10 428/440 |

* cited by examiner

*Primary Examiner* — Sheeba Ahmed
(74) *Attorney, Agent, or Firm* — Rothwell, Figg, Ernst & Manbeck, P.C.

(57) ABSTRACT

Disclosed is a hybrid composite construction material and a process for creating it. The substrate used to create the new hybrid material has the same compound applied on at least the side lap area on the top side of the substrate and at least a portion of the back side of the substrate. The substrate can be pre-saturated with a selected compound prior to applying the same compound on at least the side lap area on the top side of the substrate and at least a portion of the back side of the substrate. The processes to create the product and other embodiments is also disclosed.

28 Claims, 2 Drawing Sheets

Production Line (27) moves from right to left.

Production Line moves from right to left.

CONSTRUCTION MATERIAL WITH IMPROVED LAP INTEGRITY

CROSS-REFERENCE TO RELATED APPLICATION

The present application is a claims priority to U.S. Provisional Patent Application Ser. No. 62/930,199 filed Nov. 4, 2019, which is hereby incorporated herein by reference in entirety for all purposes.

FIELD

The present invention relates to building construction materials for forming an exterior building surface, and more particularly, to roofing, siding, and the like, which form a weather barrier allowing the construction of a weather-controlled building envelope that shields the interior of the building from the intrusion of air, vapor, precipitation, solar radiation and the like.

BACKGROUND

Modified bituminous or asphalt roofing membranes, siding material, water proofing, air barriers, vapor barriers or the like are classified into two major groups, "plastomeric" that are primarily modified with thermoplastic materials like Atactic Polypropylene (APP) and the like and "elastomeric" that are primarily modified with elastomers like Styrene Butadiene rubber (SBS) and the like. Typically modified bitumen cap and base sheets as well as some underlayment products are constructed with a carrier sheet or substrate made from polyester, fiberglass, glass reinforced polyester, and the like. The modifiers change the properties of the asphalt and or bitumen to increase its utility as a construction, building and or roofing material, e.g., to make it more elastic, have greater flexibility at low temperatures, have greater heat resistance at high temperatures, have better resistance to softening and flow and have less deformation from mechanical forces, etc.

Plastomeric modified bitumen products are manufactured using bitumen (asphalt)modified with one or more polymers such as Atactic Polypropylene (APP), Amorphous Poly Alpha Olefin (APAO), Thermoplastic Polyolefin (TPO), low density polyethylene (LDPE), high density polypropylene (HDPE), Polypropylene and the like. Typical plastomeric APP modified bitumen membranes comprise a substrate made of polyester, glass reinforced polyester or fiberglass mat or the like. The substrate is embedded in the modified bitumen compound and plastomeric modified compound is applied on the top as well as on the bottom of the substrate so that the plastomeric APP modified compound saturates the substrate during production as is well known in the industry.

Some of the advantages of using plastomeric modified bitumen materials for waterproofing is improved ultraviolet weathering resistance, improved resistance to damage caused by exposure to external oils, fats, acids and the like and better scuff resistance when compared to materials made with asphalt alone or with materials made with elastomeric SBS modified bitumen compound. Typically plastomeric modified bitumen compound has a higher ring and ball softening point and a lower needle penetration value than elastomeric SBS modified bitumen compound making it harder and easier to walk on with less abrasion.

Typically, plastomeric modified bitumen membranes are finished on the top surface with granules or the like of various colors to help protect the material and add an aesthetically pleasing look to the roofing, waterproofing or siding material. The granules are usually placed in the weathering or exposed section of the material. In most cases the granules do not cover the entire top surface of the material as there is a need to leave an uncovered area that is known in the industry as the side lap area to adhere the overlying membrane course to the underlying membrane course together.

Plastomeric modified bitumen based materials are usually installed by heat welding techniques using a propane torch, hot air or the like where a heat source is used to melt the APP modified bitumen material on the bottom of the overlaying membrane and the top of subsequent underlying rolls where they overlap to adhere the material together to form heat welded seams for good attachment and bond strength.

Plastomeric modified bitumen membranes are not typically applied or installed with molten asphalt or cold applied mastics as the plastic nature of these materials make it more difficult to bond and maintain the bond strength over the life of the material when installed in this manner.

It has been found that when unmodified molten asphalt or bitumen is used to bond the plastomeric modified bitumen membranes together particularly along the side lap region of the material where there are no granules, light ends or oils could come to the interface between the bonding asphalt and the plastomeric modified bitumen compound. These light ends are not readily absorbed into the plastomeric compound or bonding asphalt and can cause the bond between these materials to weaken and overtime bond failure can occur.

Cold applied mastics and cements are not generally used to bond or apply plastomeric modified bitumen materials either. The adhesive qualities and bond strength of cold applied mastics and cements increase as the solvent dissipates and or evaporates out of the cold applied mastic or cement. Due to this plastic like behavior of the APP modified bitumen material, the solvent from cold applied mastics and cements cannot easily dissipate through the plastomeric material. This causes the solvent to be retained in the mastic and or cement that often causes a reduction in bond strength while increasing the time it takes for the adhesive to set up. Solvent can be trapped between the plastomeric material and roofing structure or the like and often this solvent will dissipate through the structure and into the building that can cause an unpleasant odor to the occupants and at times a health concern if the structure is not properly ventilated.

There needs to be an alternative way to construct and or manufacture the plastomeric APP modified bitumen material so that these plastomeric materials that building owners, contractors and architects a like specify based on their performance properties, that can be applied and installed using molten asphalt and or cold applied mastics and cements or the like, instead of being applied, installed and or bonded together using heat welding techniques particularly where propane torches or the like have been banned by cities and municipalities and or when insurance companies make it prohibitive to use propane torches or the like due to the chance of a fire occurring.

Elastomeric modified bitumen products are modified with one or more polymers that may include Styrene-Butadiene-Styrene (SBS), Styrene-Ethylene-Butadiene-Styrene (SEBS), Styrene-Isoprene-Styrene (SIS), Styrene-Butadiene diblock (SB), synthetic rubber and the like. Sometimes a small amount of plastic material like Low Density Polyethylene (LDPE) or similar materials and polymers are added to the compound to lower the overall cost.

Elastomeric modified bitumen membranes often comprise of a substrate of polyester, glass reinforced polyester, fiberglass or the like. The substrate is typically embedded in the compound and elastomeric modified compound is applied on the top if desired as well as on the bottom of the substrate. The substrate could be pre-saturated with asphalt or bitumen or asphaltic or bitumen compound and or an elastomeric (SBS) or plastomeric (APP) compound and or can be saturated with the elastomeric (SBS) modified compound or the plastomeric (APP) compound used for the top and or bottom compounds during production as desired.

Materials made with elastomeric modified bitumen compound are valued for their flexibility, resistance to cracking in cold climates and multiple application methods. The lower softening point of elastomeric modified bitumen compound when compared to plastomeric modified bitumen compound is advantageous for bonding with molten asphalt. Also the elastomeric polymers ability to absorb and help alleviate solvents up and out of the system allows for good bond strength with less odor trapped inside the structure when cold applied adhesives or mastics are used is a benefit over membranes traditionally made with plastomeric modified bitumen compound.

Elastomeric modified bitumen membranes can also be heat welded but requires a certain technique. The elastomeric compound does not flow as readily or at all during the heat welding process unlike when plastomeric modified bitumen compound is heat welded. More care is needed not to overheat and damage the elastomeric modified bitumen material. Elastomeric modified bitumen material can also be finished on the surface with granules of various colors or the like to add an aesthetically pleasing look to the roofing or siding material. These granules are needed in the exposed areas to protect the elastomeric modified material due to the fact that ultraviolet (UV) light from the sun can damage some elastomeric polymers like styrene-butadiene-styrene (SBS) that have double carbon bonds in the polymer backbone. In most cases the upper surfacing, i.e. granules or the like, do not cover the entire top surface of the material as there is a need to leave an uncovered area that is known in the industry as the side lap area to adhere overlapping materials.

Unlike most traditional plastomeric modified bitumen compound materials, elastomeric modified bitumen compound materials can also be finished with films like aluminum, polyvinylidene fluoride (PVDF) or the like due to the adhesive qualities and rubber nature of the polymers used to make the compound. These films help protect the elastomeric material from UV, impart solar reflectivity and add an aesthetically pleasing look to the roofing or siding structure. The elastomeric polymers used to modify the bitumen can absorb light ends and oils from the bitumen itself and or from the molten asphalt used to manufacture and install them that allow for good bonding with mopping asphalts. The elastomeric polymers also can help dissipate the solvents up and through the elastomeric modified bitumen material so cold applied mastics and cements are often used to install and apply these elastomeric modified materials.

The construction and manufacturing of self-adhered (SA) membranes is well known in the industry today. These self-adhering membranes usually have a substrate made of polyester, glass, or combinations thereof or similar materials that is embedded into the compound for structural integrity. Above the substrate usually elastomeric compound and in some cases plastomeric compound is used for the top or upper section of the material. Elastomeric tacky self-adhering asphalt and or tacky self-adhering modified bitumen compound is usually used on the bottom of the substrate and at times the material is made entirely of elastomeric tacky compound.

The upper compound that will be exposed to the elements is usually finished and or surfaced with granules, fabric, films or the like to protect the material and add an aesthetically pleasing look to the material. In most cases the upper surfacing, i.e. granules or the like, do not cover the entire top surface of the material as there is a need to leave an uncovered area that is known in the industry as the side lap area to adhere the overlying material or membrane course to the underlying material or membrane course together for ease of application and bonding.

The side lap area is an important feature of construction materials as this is where overlapping courses of material are bonded together to keep the building or structure watertight. It is important as has been noted above that the materials, i.e. asphalt, cold applied cements and mastics and the like used to bond construction and or building materials together must be compatible with the material it is being used on.

The side lap area is typically finished with a parting agent to protect and prevent sticking during storage and transportation. This parting agent can be sand, talc or the like, film made of polypropylene, polyester, polyethylene or combinations thereof or the like, a silicone coated release film and or silicone treated release liner or the like are used as needed. If a release film or release liner is used on the side lap area it is removed prior to application of the overlaying material.

For self-adhered materials, particularly hybrid plastomeric and elastomeric materials, the materials or compound used on or in the side lap area must be compatible with the compound or material used on the bottom or back of the material. To solve the compatibility issue, some manufactures use the same tacky self-adhering compound on the top and the bottom of the material but this can be an issue during installation, storage and transportation.

The tacky self-adhering modified bitumen compound used in and for self-adhering materials is soft in nature and much softer in comparison to the asphalt used for shingles and build up roofing (BUR) materials, much softer than plastomeric modified bitumen compound and even softer than elastomeric modified bitumen compound generally used to make roofing and or building and or construction materials. The soft nature of self-adhering membranes are more difficult to install during hot temperatures as they will scuff and abrade more readily and care must be used when walking on these membranes so as to not damage the surface of the material.

Scheirer et al in U.S. Pat. No. 7,803,239 B2 discloses an elastomeric SBS, SIS self-adhering flashing cap strip and end lap connector cap sheet assemblies that includes a reinforcing layer (substrate) encapsulated within self-adhering elastomeric modified bitumen above and below the reinforcing layer. The bottom major surfaces of the flashing cap strips and the connector end lap cap sheets are formed by self-adhering elastomeric modified bitumen and the top major surfaces of the flashing cap strips and the connector end lap cap sheets have lateral edge portions formed by the same self-adhering elastomeric modified bitumen compound and a coated central portion made of the same self-adhering elastomeric modified bitumen compound that extends between the lateral edge portions.

A problem that often needs to be overcome with Scheirer's invention is that self-adhered elastomeric compound by its nature is soft and can cause issues during transportation, storage and installation as previously mentioned above. When elastomeric materials particularly elastomeric self-adhered material is placed in a hot environment or in direct sunlight, the elastomeric compound becomes softer as it absorbs heat and during installation, the softness of the compound can become an issue as the material loses rigidity. The elastomeric material can become difficult to handle and difficult to walk upon without marring or scuffing the surface. This is particularly true of material made entirely of self-adhered elastomeric compound like that made by Scheirer, et al.

Zanchetta et al. in U.S. Pat. No. 6,924,015 B2 discloses a hybrid modified bitumen material comprised of a plastomeric APP top compound and a layer of elastomeric self-adhered compound on the bottom of the material. The plastomeric top or upper surface of this hybrid modified bitumen material is inherently harder in nature than most elastomeric modified bitumen compounds and is much harder than elastomeric self-adhered modified bitumen compounds. This is especially true when the material is placed in a hot environment or placed in direct sunlight.

Zanchetta, et al solved the handling and walkability issues of elastomeric modified bitumen material particularly material made entirely of elastomeric self-adhered compound like that of Scheirer, et al but another issue needed to be overcome. That issue was how to bond and maintain the bond strength through the life cycle of the material between the elastomeric self-adhering back compound to the plastomeric modified bitumen compound in the top side lap area since these two modified bitumen compounds are so dissimilar with completely different behaviors.

Zanchetta, et al attempted to overcame the issue of bonding dissimilar compounds in U.S. Pat. No. 6,924,015 B2 by adding a treatment on top of the existing plastomeric compound in the side lap area on the top side of the material to enhance the bonding strength and performance between the elastomeric self-adhered compound on the bottom of the material and the plastomeric top compound in the side lap area. The disclosed solution consisted of adding a specially formulated elastomeric glue/adhesive that behaves like a pressure sensitive adhesive to enhance the bond between the dissimilar compounds. This special glue is applied on top of the plastomeric compound located in the side lap area and acts as a bridge of sorts between the two dissimilar compounds. This special adhesive/glue was formulated to be compatible with both the plastomeric top compound, and with the elastomeric self-adhered bottom compound in order to enhance, facilitate and maintain the bond between the dissimilar compounds when overlapping materials along the side lap area.

Zanchettas' expensive specially formulated adhesive/glue is added on top of the plastomeric top compound in the side lap area during a separate step in the manufacturing process. The bond strength reported below in Table 2 reproduced from U.S. Pat. No. 6,924,015 B2 by Zanchetta et al, shows that indeed the bond strength of the hybrid material was improved depending on the quantity of the specially formulated adhesive/glue that was applied on top of the plastomeric compound in the side lap area. The more adhesive/glue applied on the side lap area the better the bond strength at different conditioning temperatures.

TABLE 2

| Sample | RT Conditioning | 80 deg C. conditioning | 5 deg C. conditioning |
|---|---|---|---|
| No adhesive on side lap | 67.78 lbs/in | 87.73 lbs/in | 68.94 lbs/in |
| 20 grams adhesive on side lap | 78.53 lbs/in | 95.84 lbs/in | 80.35 lbs/in |
| 40 grams adhesive on side lap | 90.89 lbs/in | 102.60 lbs/in | 91.60 lbs/in |

A better, easier and cheaper solution is needed for hybrid materials, i.e. materials with one type of compound on the top surface of a substrate and a different type of compound on the bottom of the substrate, to ensure good bonding between dissimilar compounds that does not depend on the amount and distribution of a special compatible glue/adhesive to be placed on top of the existing compound located in the side lap area during a separate step in the manufacturing process.

SUMMARY

A hybrid composite construction material and a process for creating it comprising a substrate or a reinforcing carrier sheet with the same compound applied on the lap area and on at least a portion of the back side of the substrate. In another embodiment a first compound is applied to the entire top side of the surface and at least a portion of the back side of the substrate. The first compound is then removed from the lap area on the top side of the substrate and at least a portion of the back side of the substrate. Then a second compound is applied to the lap area on the top side of the substrate and on at least a portion of the back side of the substrate. The hybrid composite material can be factory-made with a first compound in the exposed weathering area on the top side of the substrate and a second compound applied on both the entire bottom side of the substrate and on the top side of the substrate in the non-weathering or side lap area adjacent to the first compound once the first compound is scraped off and removed from these two areas.

PARTS LIST

Figure 1:
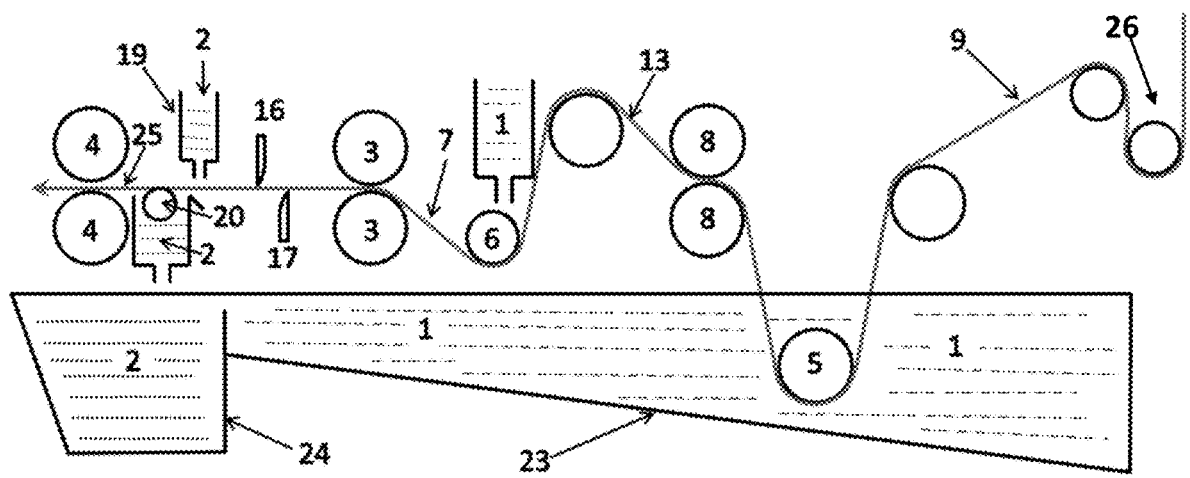
FIG. 1 shows the substrate material as it moves through the production line creating the hybrid composite material.

1 First compound
2 Second compound
3 Thickness rolls
4 Calender rolls
5 First coating station
6 Second coating station
7 Coated substrate
8 Squeeze rolls
9 Substrate
10 Not used
11 Not used
12 Not used
13 Saturated substrate
14 Side lap area
15 Not used
16 Top side lap area scraper
17 Back side scraper
18 Mechanical stop
19 Second compound applicator for side lap area 20 Second compound applicator for bottom/back side
21 Surfacing
22 Weathering area
23 First compound vat
24 Second compound vat
25 Hybrid composite material
26 Dry end looper
27 Production line

DETAILED DESCRIPTION

An innovative technique has been discovered that partially or completely replaces the compound in the side lap area of hybrid composite materials with the same compound that is used and or applied on the back or bottom of the hybrid composite material. The disclosed hybrid composite material and process eliminates the need to apply the expensive specially formulated glue/adhesive on the top of the existing side lap compound. This reduces costs and improves long and short term compatibility. The compound used in the overlapping side lap area will now be bonded to the same compound used on the back and or bottom of the material ensuring that the hybrid composite material will perform as intended.

The disclosed hybrid composite material and process also eliminates the dependency of the manufacturing process to apply the expensive adhesive/glue in sufficient quantity and amount to facilitate the bonding of dissimilar compounds in hybrid composite materials. The disclosed hybrid composite material has many applications such as for roofing, siding, building, or construction material. The disclosed also eliminates the need to have the entire material made entirely of a softer, less functional pressure sensitive or self-adhering adhesive compound and opens the door to different multiple compound hybrid composite construction materials.

In one embodiment, the disclosed hybrid composite material includes plastomeric modified bitumen compound used in the weathering area on the top/upper side of a substrate, and elastomeric compound used on both the back/bottom side of the substrate and in the side lap area located on the top or upper side of the substrate. The disclosed hybrid composite material is an all plastomeric material converted during the manufacturing process to a material that is a hybrid composite utilizing both a plastomeric compound in the weathering area on the top side of a substrate and an elastomeric self-adhered compound used on both the back side of the substrate and in the side lap area adjacent to the plastomeric compound on the top of the material.

The disclosed hybrid composite material and process includes altering the manufacturing process of materials particularly modified and unmodified bitumen membranes and the like that use a substrate or multiple substrates. Examples of the materials used for the substrates are: glass mat, glass scrims and the like; polyester mats either woven or nonwoven; polyester scrims either woven or nonwoven; glass mat, glass scrims, glass filaments and the like in combination with polyester mats that are woven or nonwoven and the like. Other types of substrates include: mats, or reinforcement carrier support sheets made of materials that are known and are commonly used as substrates in the manufacturing of roofing materials, siding materials, building materials, construction materials and the like A preferred manufacturing process used for the creation of the disclosed hybrid composite material is disclosed below and is not intended to be the only way to manufacture the material.

There are several different ways to saturate the substrate and add top/upper compound and bottom/back compound that can consist of plastomeric modified bitumen, elastomeric modified bitumen compound or even unmodified bitumen and the like well-known in the industry today. Once the disclosed hybrid composite material and process is understood, it will become apparent to one versed in the production of material used for roofing, siding, construction and or building materials and the like, how to alter and modify this process to adapt other production methods well-known in the industry to achieve the same desired result.

In one embodiment, the disclosed hybrid composite material 25 comprises a substrate that is about 1 meter (about 39.4 inches) wide and that is about 1 mm (about 0.04 inches) thick. In another embodiment, the disclosed hybrid composite material 25 comprises a substrate that is about 0.9 meters (about 36 inches) wide and about 0.6 mm (about 0.024 inches) thick. But the substrate used can be of any thickness and of any width for the disclosed hybrid material.

Substrate 9 typically come in large master rolls and are unwound during the manufacturing process usually into dry end looper 26 that contain rolls that move up and down individually or as a unit or both. When substrate 9 is almost completely used up on the first master roll another master roll of substrate 9 can be put in place and the end of the second master roll of substrate 9 is spliced onto the first master roll of substrate 9 using tape, adhesive and the like well-known in the industry today. Dry end looper 26 holds excess substrate 9 so that production line 27 does not have to stop and or slow down during the splicing together of the two master rolls of substrate 9. Subsequent rolls of substrate 9 on production line 27 are consumed and used in this manner for a continuous production process for the disclosed hybrid composite material 25.

In one embodiment of the disclosed process, substrate 9 leaves optional dry end looper 26 and enters first compound vat 23 on production line 27 where it is coated at first coating station 5 with first compound 1. Coated substrate 7 then passes through a set of adjustable squeeze rolls 8 located inside or above the first compound vat 23 to squeeze first compound 1 into substrate 9 and or substrate 9 passes over and or under rollers and or scrapers located inside first compound vat 23 to ensure that substrate 9 is completely saturated with first compound 1. Excess first compound 1 falls back into first compound vat 23 to be used again.

Saturated substrate 13 is then coated with first compound 1 at second coating station 6 in first compound vat 23 so that there is first compound 1 on both sides of saturated substrate 13. Coated substrate 7 then enters a set of thickness/calender rolls 3 where a predefined thickness of first compound 1 will remain across the entire upper/top surface and across the entire bottom/back surface of coated substrate 7 after exiting thickness rolls 3 located in or above first compound vat 23 so that excess first compound 1 falls back into first compound vat 23 to be used again.

After coated substrate 7 passes through a set of thickness rolls 3 to achieve a predefined top and bottom thickness, the back side of coated substrate 7 passes over adjustable back side scraper 17 that is typically wider than the width of coated substrate 7 and can be adjusted so that all, most, or a portion of first compound 1 located on the backside of the coated substrate 7 can be removed from coated substrate 7 as desired.

Adjustable back side scraper 17 is located above or in first compound vat 23 so that the desired amount of first compound 1 that is removed from the back side of coated substrate 7 falls back into first compound vat 23 to be used again.

In a preferred embodiment, first compound 1 is removed from the back side of coated substrate 7, so that some of the fibers from which the substrate is made, become visible on the back side of coated substrate 7. These exposed fibers help to mechanically attach and bond second compound 2 that is applied with applicator 20 to the back side of scraped coated substrate 7. Back side scraper 17 is wider than the width of the coated substrate 7 for ease of production.

At or about the same time that first compound 1 is being removed by back side scraper 17, a small adjustable side lap scraper 16 located on the top side of coated substrate 7 in first compound vat 23, scrapes the top side first compound 1 longitudinally along coated substrate 7 in side lap area 14. Top side lap scraper 16 is wider than the desired side lap area 14 width and can be adjusted so that all or a portion of first compound 1 is removed from and along the side lap area 14. First compound 1 that is removed from the top side lap area 14 falls back into first compound vat 23 to be used again.

The top and back side scraped coated substrate 7 from the disclosed process, exits first compound vat 23 and enters second compound vat 24 on production line 27 that contains second compound applicator 19 for the side lap area and second applicator 20 for the back side located in or above second compound vat 24 on production line 27. Second compound 2 will be used and applied to the desired thickness across the entire back side of scraped and coated substrate 7 and in the scraped side lap area 14 adjacent to first compound 1 that remained on the top or upper side of coated substrate 7.

Second compound 2 for the disclosed process is applied on and in the side lap area by means of a transfer pump and a supply line that meters on second compound 2 to a thickness of about 0.1-2.0 mm in side lap area 14 using second compound applicator 19 located above second compound vat 24. Mechanical stop 18 prevents second compound 2 applied in the side lap area 14 from intermingling with the previously applied first compound 1 along side lap area 14 where the two compounds meet. Mechanical stop 18 also allows excess second compound 2 to fall back into second compound vat 24 without being contaminated so that second compound 2 can be used again.

Second compound applicator 20 applies second compound 2 to the back side of coated substrate 7 by means of a transfer, inking or kiss coat roll, extruder, or the like. For the disclosed process, inking roll 20 is used to apply second compound 2 to the back side of the coated substrate 7. Hybrid composite material 25 then passes through a set of calender rolls 4 where typically only the bottom heated calendar roll 4 is usually rotating opposite the direction of production line 27 is used in this disclosed process to achieve the desired back side compound thickness. Excess second compound 2 falls back into second compound vat 24 so it can be used again.

Hybrid composite material 25 will have superior bonding and compatibility between rolls, pieces, sections and the like where they are overlapped in the field since the same compound, second compound 2 in the disclosed process, is used in side lap area 14 and on the back side of hybrid composite material 25 that are being overlapped and bonded together. If one desires, a different compound formula can be used to saturate substrate 9.

In another embodiment of the disclosed process, saturated substrate 13 is coated with first compound 1 at second coating station 6 only on the top side of saturated substrate 13 in first compound vat 23. Top coated substrate 7 then passes through a set of adjustable thickness rolls 3 located inside and or above first compound vat 23 to obtain the desired top side first compound 1 thickness. Excess first compound 1 falls back into first compound vat 23 to be used again.

Since there is no back side first compound 1 to scrape off only small adjustable side lap scraper 16 located on the top side of coated substrate 7 in first compound vat 23, is used to scrape the top side first compound 1 longitudinally along coated substrate 7 in side lap area 14. Top side lap scraper 16 is wider than the desired side lap area 14 width and can be adjusted so that all or a portion of first compound 1 is removed from and along the side lap area 14. First compound 1 that is removed from the top side lap area 14 falls back into first compound vat 23 to be used again.

Top scraped coated substrate 7 from the disclosed process, exits first compound vat 23 and enters second compound vat 24 on production line 27 that contains second compound applicator 19 for the side lap area and second applicator 20 for the back side located in or above second compound vat 24 on production line 27. Second compound 2 will be used and applied to the desired thickness across the entire back side of coated substrate 7 and in the scraped side lap area 14 adjacent to first compound 1 that remained on the top or upper side of coated substrate 7.

Second compound 2 for the disclosed process is applied on and in the side lap area by means of a transfer pump and a supply line that meters on second compound 2 to a thickness of about 0.1-2.0 mm in side lap area 14 using second compound applicator 19 located above second compound vat 24. Mechanical stop 18 prevents second compound 2 applied in the side lap area 14 from intermingling with the previously applied first compound 1 along side lap area 14 where the two compounds meet. Mechanical stop 18 also allows excess second compound 2 to fall back into second compound vat 24 without being contaminated so that second compound 2 can be used again.

Hybrid composite material 25 then passes through a set of calender rolls 4 where typically only the bottom heated calendar roll 4 is usually rotating opposite the direction of production line 27 is used in this disclosed process to achieve the desired back side compound thickness. Excess second compound 2 falls back into second compound vat 24 so it can be used again.

Hybrid composite material 25 will have superior bonding and compatibility between rolls, pieces, sections and the like where they are overlapped in the field since the same compound, second compound 2 in the disclosed process, is used in side lap area 14 and on the back side of hybrid composite material 25 that are being overlapped and bonded together. If one desires, a different compound formula can be used to saturate substrate 9.

In yet another embodiment of the disclosed process, substrate 9 leaves optional dry end looper 26 and enters first compound vat 23 on production line 27 where it bypasses first coating station 5 and is only coated with first compound 1 on the top side at second coating station 6. Top-coated substrate 7 enters a set of thickness rolls 3 where a predefined thickness of first compound 1 will remain across the entire upper or top surface of coated substrate 7 and coated substrate 7 in partially saturated with first compound 1. Excess first compound 1 falls back into first compound vat 23 to be used again.

Since there is no back side first compound 1 to scrape off only small adjustable side lap scraper 16 located on the top side of coated substrate 7 in first compound vat 23, is used to scrape the top side first compound 1 longitudinally along coated substrate 7 in side lap area 14. Top side lap scraper 16 is wider than the desired side lap area 14 width and can be adjusted so that all or a portion of first compound 1 is removed from and along the side lap area 14. First compound 1 that is removed from the top side lap area 14 falls back into first compound vat 23 to be used again.

Top scraped coated substrate 7 from the disclosed process, exits first compound vat 23 and enters second compound vat 24 on production line 27 that contains second compound applicator 19 for the side lap area and second applicator 20 for the back side located in or above second compound vat 24 on production line 27. Second compound 2 will be used and applied to the desired thickness across the entire back side of coated substrate 7 and in the scraped side lap area 14 adjacent to first compound 1 that remained on the top or upper side of coated substrate 7.

Second compound 2 for the disclosed process is applied on and in the side lap area by means of a transfer pump and a supply line that meters on second compound 2 to a thickness of about 0.1-2.0 mm in side lap area 14 using second compound applicator 19 located above second compound vat 24. Mechanical stop 18 prevents second compound 2 applied in the side lap area 14 from intermingling with the previously applied first compound 1 along side lap area 14 where the two compounds meet. Mechanical stop 18 also allows excess second compound 2 to fall back into second compound vat 24 without being contaminated so that second compound 2 can be used again.

Second compound applicator 20 applies second compound 2 to the back side of coated substrate 7 by means of a transfer, inking or kiss coat roll, extruder, or the like. For the disclosed process, inking roll 20 is used to apply second compound 2 to the back side of the coated substrate 7. Hybrid composite material 25 then passes through a set of calender rolls 4 where typically only the bottom heated calendar roll 4 is usually rotating opposite the direction of production line 27 is used in this disclosed process to achieve the desired back side compound thickness. Excess second compound 2 falls back into second compound vat 24 so it can be used again.

Hybrid composite material 25 will have superior bonding and compatibility between rolls, pieces, sections and the like where they are overlapped in the field since the same compound, second compound 2 in the disclosed process, is used in side lap area 14 and on the back side of hybrid composite material 25 that are being overlapped and bonded together. If one desires, a different compound formula can be used to saturate substrate 9.

Generally for the disclosed processes, the thickness of the upper or top compound portion of hybrid composite material 25 above coated substrate 7 as it exits thickness rolls 3 and calender rolls 4 typically ranges from about 0.1 to about 4.0 mm and the thickness of the bottom compound portion of the material below the substrate as it exits calender rolls 4 will typically have a thickness that ranges between about 0.1 to about 4.0 mm in thickness.

A preferred top/upper thickness for hybrid composite material 25 above coated substrate 7 will range from about 0.1 to about 2.0 mm. The preferred back side thickness for hybrid composite material 25 located below coated substrate 7 will range from about 0.1 to about 3.0 mm. The preferred total thickness of finished hybrid composite material 25 will range from about 0.6 mm to about 5.5 mm. The preferred thickness range will vary depending on the original thickness of the substrate being used.

The importance of this disclosed process and embodiments is that compatible or similar compounds are used in side lap area 14 and the back side of hybrid composite material 25 that differ from the top or upper compound used above coated substrate 7 to make hybrid composite material 25.

FIG. 1 shows a section of the production line moving right to left with substrate 9 being coated with molten first compound 1 in first coating station 5 located in vat 23. Substrate 9 is saturated with molten first compound 1 using adjustable squeeze rolls 8 to achieve saturated substrate 13 so that excess molten first compound 1 falls back into vat 23 to be used again.

Saturated substrate 13 is coated with molten first compound 1 at second coating station 6 located above vat 23 so that excess first compound 1 falls back into vat 23 to be used again. Coated substrate 7 passes through a set of thickness rollers 3 located above vat 23 to achieve the desired top and bottom compound thickness so that molten first compound 1 is recovered in vat 23 to be used again.

Back side scraper 17 is engaged in vat 23 to remove molten first compound 1 from the entire bottom width of coated substrate 7 to the desired thickness so that first compound 1 is captured back into vat 23 to be used again.

Figure 2:
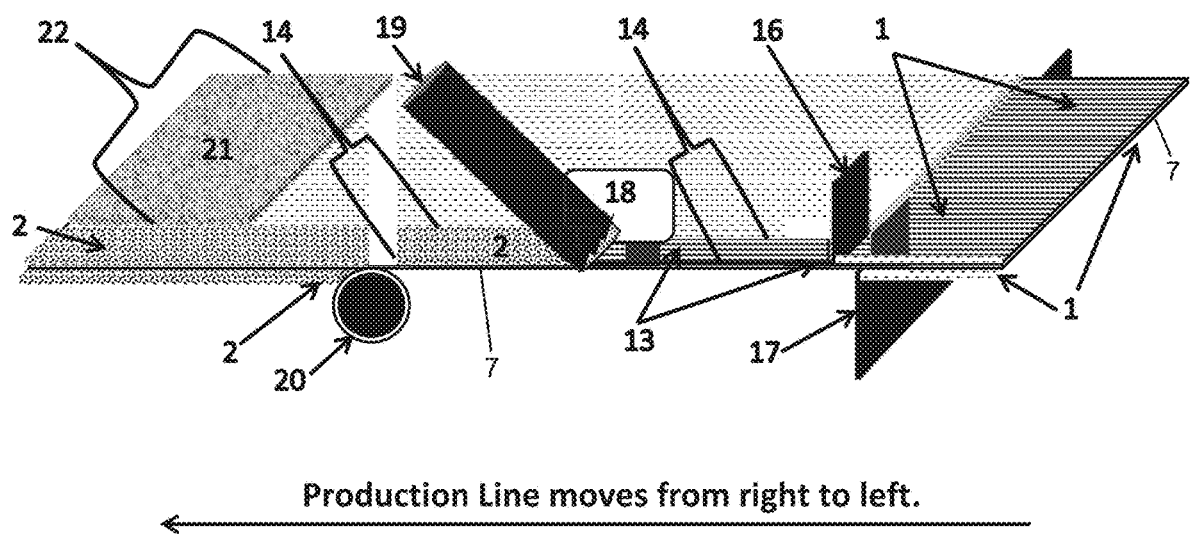
FIG. 2 shows a section of the production line

Top scraper 16 is engaged and adjusted to scrape molten first compound 1 longitudinally along one top edge of coated substrate 7 to the desired side lap width and depth in side lap area 14 as shown in FIG. 2 so that first compound 1 is recovered into vat 23 as shown in FIG. 1 to be used again.

Scraped coated substrate 7 moves along the production line from vat 23 to vat 24 as shown in FIG. 1. Molten second compound 2 is pumped and applied onto the substrate using applicator 19 in and on scraped side lap area 14 as shown in FIG. 2. Mechanical stop 18 prevents second compound 2 from intermingling with first compound 1 along the side lap area 14 as shown in FIG. 2 so that excess second compound 2 falls back into vat 24 to be used again as shown in FIG. 1.

Second compound 1 is applied to the back of coated substrate 7 in vat 24 using inking roll 20 as shown in FIG. 1 and FIG. 2. Excess second compound 2 is recovered in vat 24 to be used again as shown in FIG. 1. Hybrid composite material 25 passes through calender rolls 4 located above vat 24 to obtain the desired thickness of second compound 2 that was applied on the back of coated substrate 7 as shown in FIG. 1. Excess second compound 2 falls back into vat 24 to be used again as shown in FIG. 1.

FIG. 2 shows a section of the production line moving from right to left. Saturated substrate 13 has been coated on the top and bottom surfaces with molten first compound 1. Top scraper 16 removes molten first compound 1 to the desired thickness inside lap area 14. Back side scraper 17 removes molten first compound 1 to the desired thickness from entire bottom width of saturated substrate 13. Applicator 19 applies molten second compound 2 in scraped side lap area 14 to the desired thickness while mechanical stop 18 prevents molten second compound 2 from intermingling with molten first compound 1 inside lap area 14. Applicator 20 applies molten second compound 2 to the desired thickness on the back of scraped saturated substrate 13. Optional surfacing 21 are applied in weathering area 22.

Table 1 below shows the improvement in shear and peel test results when using elastomeric self-adhered compound replacing the specially formulated glue/adhesive in the side lap area of a plastomeric/elastomeric hybrid composite material.

TABLE 1

| Lap Joint (Shear) CGSB* 37-GP-56-M | Maximum Load (lbf) | Failure Mode |
|---|---|---|
| Prior Art** glue in side lap | 94.4 +/− 4.1 | Adhesive |
| New Elastomeric Self-Adhered Compound in side lap*** | 113.9 +/− 2.4 | Adhesive |
| Percent Improvement | 20.7% | |
| T-Peel Adhesion ASTM**** D1876-08 (2015) | Avg Load/width (lbf/ft) | Failure Mode |
| Prior Art** glue in side lap | 63.7 +/− 7.6 | Adhesive |
| New Elastomeric Self-Adhered Compound in side lap*** | 97.5 +/− 3.8 | Adhesive |
| Percent Improvement | 53.1% | |

*Canadian General Standards Board
**Plastomeric Top Compound with 4.5 grams/linear meter of Special Glue on top of Plastomeric Compound in the side lap area bonded to the Elastomeric Self-Adhered Bottom Compound
***Plastomeric Top Compound with 0.35 mm of Elastomeric Self-Adhered Compound thickness applied in the side lap area bonded to the same Elastomeric Self-Adhered Bottom Compound
****American Society for Testing and Materials A 20.7% improvement in shear testing was recorded when tested by CGSB Lap Strength test method and a 53.1% improvement in peel strength was recorded when tested by ASTM D1876 T-Peel test method.

An embodiment for the disclosed process is:
1. Coat substrate 9 with first compound 1 at a temperature between 100 and 250° C. in first coating station 5 located in first compound vat 23.
2. Saturate substrate 9 with same first compound 1 using adjustable squeeze rolls 8 or rolls in an S-wrap or similar configuration to achieve saturated substrate 13 so that excess first compound falls back into first compound vat 23 to be used again.
3. Recoat saturated substrate 13 with a temperature between 100-250° C. first compound 1 at second coating station 6 located in and or above first compound vat 23 so that excess first compound 1 falls back into first compound vat 23 to be used again.
4. Coated substrate 7 passes through a set of thickness rolls 3 located above first compound vat 23 to achieve the desired top and bottom compound thickness so that first compound 1 is recovered in first compound vat 23 to be used again.
5. Back side scraper 17 is engaged in first compound vat 23 to remove molten first compound 1 from the entire bottom width of coated substrate 7 to the desired thickness so that first compound 1 is captured back into first compound vat 23 to be used again.
6. Top side lap scraper 16 is engaged and adjusted to scrape molten first compound 1 longitudinally along one top edge of the coated substrate 7 to the desired side lap 14 width and depth so that first compound 1 is recovered into first compound vat 23 to be used again.
7. Scraped coated substrate 7 moves from first compound vat 23 to second compound vat 24 along production line 27.
8. 100-250° C. molten second compound 2 is pumped and applied onto the coated substrate 7 in and on scraped side lap area 14.
9. Mechanical stop 18 prevents second compound 2 from intermingling with first compound 1 along the side lap area 14 in second compound vat 24 so that excess second compound 2 falls back into second compound vat 24 to be used again.
10. 100-250° C. molten second compound 2 is applied to the back side of coated substrate 7 in second compound vat 24 using inking roll applicator 20. Excess second compound 2 is recovered in second compound vat 24 to be used again.
11. Hybrid composite material 25 passes through calender rolls 4 located above second compound vat 24 to obtain the desired thickness. Excess second compound 2 falls back into second compound vat 24 to be used again.
12. Hybrid composite material 25 is cooled, finished with release liner and or film and or granules, sand, etc. can be applied to the weathering area 22 if desired as is known in the industry today, cut into sections and or rolls and packaged.

It should be noted that there are many ways to achieve the desired hybrid composite material configuration using alternate manufacturing processes known in the industry. Also methods known in the industry can be used to saturate or pre-saturate the substrate with elastomeric and or plastomeric compound, asphalt, bitumen and or a different modified bitumen compound and the like in one or more steps to prevent water infiltration into the substrate to improve the durability of the material and at times lower the overall costs of the material if desired. Examples of First Compound 1 that can be used for the disclosed hybrid composite material include:
1. Plastomeric (APP) modified bitumen compounds
2. Elastomeric (SBS) modified bitumen compounds
3. Self-Adhered or pressure sensitive adhesive (PSA) modified bitumen compounds
4. Asphalt or bitumen compounds Examples of Second Compound 2 that can be used for the disclosed hybrid composite material include:
1. Elastomeric (SBS) modified bitumen compounds
2. Self-Adhered or pressure sensitive adhesive (PSA) modified bitumen compounds
3. Asphalt or bitumen compounds
4. Plastomeric (APP) modified bitumen compounds Examples of hybrid composite materials that this invention includes but are not limited to are materials that have:
1. Plastomeric (APP) First Compound 1 used on the top side of a substrate with elastomeric self-adhered or pressure sensitive Second Compound 2 utilized on the top side lap area and on the back side of the substrate,
2. Plastomeric (APP) First Compound 1 used on the top side of a substrate utilizing elastomeric (SBS) Second Compound 2 on the top side lap area and on the back side of the substrate,
3. Plastomeric (APP) First Compound 1 used on the top side of a substrate utilizing asphaltic or bitumen Second Compound 2 on the top side lap area and on the back side of the substrate,
4. Elastomeric (SBS) First Compound 1 used on the top side of a substrate utilizing elastomeric self-adhered or pressure sensitive Second Compound 2 on the top side lap area and on the back side of the substrate,
5. Elastomeric (SBS) First Compound 1 used on the top side of a substrate utilizing plastomeric (APP) Second Compound 2 on the top side lap area and on the back side of the substrate,
6. Elastomeric (SBS) First Compound 1 used on the top side of a substrate utilizing asphalt or bitumen Second Compound 2 on the top side lap area and on the back side of the substrate,
7. A material with a First Compound 1 used on the top side of a substrate utilizing Second Compound 2 on the top side lap area and on the back side of the substrate, 8. A material with a First Component 1 used on the top side of a substrate utilizing Second Component 2 on the top side lap area and on the back side of the substrate.

Disclosed is a hybrid composite construction material created from a substrate with a top side and a back side; a first compound applied on the top side of the substrate; a portion of the first compound subsequently removed from a side lap area on the top of the substrate; and a second compound applied on at least a portion of the back side of the substrate and applied on the side lap area on the top side of the substrate.

In another embodiment the hybrid composite construction material the substrate has a first compound applied on at least a portion of the back side of the substrate and then the first compound is at least partially removed from the back side of the substrate prior to having the second compound applied to at least a portion on the back side of the substrate.

In one embodiment the substrate is pre-saturated with asphalt or bitumen before first compound is applied to substrate. And in another embodiment the substrate is pre-saturated with a modified bitumen compound.

One process disclosed to create the hybrid composite construction material includes: selecting a substrate with a top side and a back side; loading one end of the substrate onto a production line; proceeding with the substrate into a first vat wherein the substrate is coated with a first compound on the top of the substrate and on a back side of the substrate; passing through at least one adjustable roller wherein the first compound is squeezed into the substrate; proceeding with the saturated substrate though a subsequent coating station wherein the substrate is coated with a first compound on the top side of the substrate and on a back side of the substrate and passes through at least one thickness roller to ensure a selected thickness of the first coating on the top side of the substrate and on the back side of the substrate; passing through adjustable scrapers to remove a selected amount of the first compound from the side lap area on the top side of the substrate and from at least a portion of the back side of the substrate; and passing through a second vat wherein the substrate is coated with a second compound onto at least a portion of the back side of the substrate, and onto a selected portion of the top side of the substrate.

The disclosed hybrid composite material and process demonstrates one way to accomplish the invention and those schooled in the manufacturing of these types of materials will understand that this is not the only way to construct the material and alternate manufacturing techniques are captured in the spirit of this invention.

Having described preferred embodiments which serve to illustrate various concepts, structures and techniques which are the subject of this patent, it will now become apparent to those of ordinary skill in the art that other embodiments incorporating these concepts, structures, and techniques may be used. Accordingly, it is submitted that the scope of the patent should not be limited to the described embodiments but rather should be limited only by the spirit and scope of the following claims.

We claim:

1. A construction material comprising:
 a substrate with a top side and a back side, wherein the top side of the substrate includes a weathering area and a side lap area along an entirety of an edge of the substrate, wherein the side lap area is adjacent to the weathering area;
 a first compound directly on the top side of the substrate in the weathering and side lap areas of the substrate, wherein a thickness of the first compound on the top side of the substrate in the side lap area is less than a thickness of the first compound on the top side of the substrate in the weathering area; and
 a second compound on an entirety of the back side of the substrate and on the top side of the substrate in only the side lap area, wherein the first and second compounds are different.

2. The construction material according to claim 1, further comprising the first compound on at least a portion of the back side of the substrate, and the first compound on at least the portion of the back side of the substrate is between the substrate and the second compound on the entirety of the back side of the substrate.

3. The construction material according to claim 1, wherein the substrate comprises asphalt or bitumen.

4. The construction material according to claim 1, wherein the substrate comprises a modified bitumen compound.

5. The construction material according to claim 1, wherein the first compound is a plastomeric modified bitumen compound.

6. The construction material according to claim 1, wherein the first compound is an elastomeric modified bitumen compound.

7. The construction material according to claim 1, wherein the first compound is asphalt or bitumen.

8. The construction material according to claim 5, wherein the second compound is a self-adhered modified bitumen compound.

9. The construction material according to claim 5, wherein the second compound is an elastomeric modified bitumen compound.

10. The construction material according to claim 5, wherein the second compound is asphalt and or bitumen.

11. The construction material according to claim 6, wherein the second compound is a self-adhered modified bitumen compound.

12. The construction material according to claim 6, wherein the second compound is a plastomeric modified bitumen compound.

13. The construction material according to claim 6, wherein the second compound is asphalt and or bitumen.

14. The construction material according to claim 7, wherein the second compound is a self-adhered modified bitumen compound.

15. The construction material according to claim 7, wherein the second compound is an elastomeric modified bitumen compound.

16. The construction material according to claim 7, wherein the second compound is a plastomeric modified bitumen compound.

17. The construction material according to claim 1, wherein a thickness of the second compound on the side lap area on the top side of the substrate is between 0.1 and 2.0 mm.

18. The construction material according to claim 1, wherein a thickness of the second compound on the back side of the substrate is between 0.1 and 3.0 mm.

19. A process for creating a construction material comprising:
 loading one end of a substrate with a top side and back side onto a production line, wherein the top side of the substrate includes a weathering area and a side lap area along an entirety of an edge of the substrate, and the side lap area is adjacent to the weathering area;
 proceeding with the substrate into a first vat wherein the substrate is coated with a first compound directly on the top side of the substrate in the weathering and side lap areas of the substrate and on the back side of the substrate;

passing through adjustable scrapers to remove only a portion of the first compound from the side lap area on the top side of the substrate and from at least a portion of the back side of the substrate, wherein, after passing through the adjustable scrapers, a thickness of the first compound remaining on the top side of the substrate in the side lap area is less than a thickness of the first compound on the top side of the substrate in the weathering area; and passing through a second vat wherein the substrate is coated with a second compound onto an entirety of the back side of the substrate and onto the top side of the substrate in only the side lap area from which the portion of the first compound is removed, wherein the first and second compounds are different.

20. The process for creating a construction material according to claim 19, wherein a temperature of the first compound is between 100 and 250 degrees Celsius.

21. The process for creating a construction material according to claim 19, wherein a temperature of the second compound is between 100 and 250 degrees Celsius.

22. The process according to claim 19, wherein the first compound is plastomeric modified bitumen compound.

23. The process according to claim 19, wherein the second compound is a self-adhered modified bitumen compound.

24. The construction material according to claim 1, wherein the substrate comprises a portion of the first compound that was applied directly on the top side of the substrate in the weathering and side lap areas of the substrate and squeezed into the substrate.

25. The construction material according to claim 1, wherein the thickness of the first compound on the top side of the substrate in the weathering area is between 0.1 and 4.0 mm.

26. The construction material according to claim 1, wherein the thickness of the first compound on the top side of the substrate in the weathering area is between 0.1 and 2.0 mm.

27. A construction material comprising:
a substrate with a top side and a back side, wherein the top side of the substrate includes a weathering area and a side lap area along an entirety of an edge of the substrate, wherein the side lap area is adjacent to the weathering area;
a first compound directly on the top side of the substrate in the weathering area of the substrate, wherein the first compound is not present on the top side of the substrate in the side lap area of the substrate; and
a second compound on an entirety of the back side of the substrate and on the top side of the substrate in only the side lap area wherein the first and second compounds are different.

28. The construction material according to claim 1, wherein the second compound on the entirety of the back side of the substrate is directly on the entirety of the back side of the substrate.

* * * * *